(12) United States Patent
Leung et al.

(10) Patent No.: US 9,249,053 B2
(45) Date of Patent: Feb. 2, 2016

(54) COMPOSITE WALL PANEL WITH LOW THERMAL CONDUCTIVITY AND SUFFICIENT STRENGTH FOR STRUCTURAL USE

(71) Applicant: Nano and Advanced Materials Institute Limited, Hong Kong (HK)

(72) Inventors: Christopher Kin Ying Leung, Hong Kong (HK); Kwok Fai Cheung, Hong Kong (HK); Honggang Zhu, Hong Kong (HK); Sze Wai Lin, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 0 days.

(21) Appl. No.: 13/769,808

(22) Filed: Feb. 18, 2013

(65) Prior Publication Data

US 2013/0216802 A1   Aug. 22, 2013

Related U.S. Application Data

(60) Provisional application No. 61/633,920, filed on Feb. 21, 2012.

(51) Int. Cl.
*C04B 26/00* (2006.01)
*B32B 5/18* (2006.01)
(Continued)

(52) U.S. Cl.
CPC . *C04B 26/00* (2013.01); *B32B 5/18* (2013.01); *B32B 7/02* (2013.01); *B32B 13/02* (2013.01);
(Continued)

(58) Field of Classification Search
CPC   C04B 2111/40; C04B 2201/32; C04B 26/00; C04B 38/106; B32B 5/18; Y10T 428/24967
USPC ..................................................... 428/312.4
See application file for complete search history.

(56) References Cited

U.S. PATENT DOCUMENTS 5,641,584 A * 6/1997 Andersen et al. ............. 428/703
5,772,751 A * 6/1998 Nisnevich et al. ............ 106/679
(Continued)

FOREIGN PATENT DOCUMENTS

CN        1122789 A     5/1996
CN        2560696 Y     7/2003
(Continued)

OTHER PUBLICATIONS

Chandra and Berntsson (2003), "Lightweight Aggregate Concrete: Science, Technology and Application", Ch. 7-8, Noyes Publications.
(Continued)

*Primary Examiner* — Aaron Austin
*Assistant Examiner* — Jasper Saberi
(74) *Attorney, Agent, or Firm* — Ella Cheong Hong Kong; Sam T. Yip

(57) ABSTRACT

The present invention provides a composite wall panel with good thermal insulation and sufficient strength for structural use which is designed for the fabrication of energy efficient building. The composite wall panel of the present invention comprises a foamed concrete core with sufficient compressive strength and low thermal conductivity which is sandwiched between two lightweight ductile fiber reinforced cementitious composite (FRCC) protective layers with low thermal conductivity, good barrier resistance to moisture/chloride ion/gas, multiple cracking as well as certain amount of steel reinforcements. These composite wall panels are useful in a variety of buildings in both cold and hot regions.

16 Claims, 8 Drawing Sheets

(51) Int. Cl.

| | | |
|---|---|---|
| *B32B 7/02* | (2006.01) | |
| *B32B 13/02* | (2006.01) | |
| *E04B 2/00* | (2006.01) | |
| *C04B 28/02* | (2006.01) | |
| *C04B 38/10* | (2006.01) | |
| *B32B 13/04* | (2006.01) | |
| *E04C 2/04* | (2006.01) | |
| *E04B 2/84* | (2006.01) | |
| *C04B 111/00* | (2006.01) | |
| *E04B 1/80* | (2006.01) | |
| *E04C 5/07* | (2006.01) | |

(52) U.S. Cl.
 CPC .............. *B32B 13/045* (2013.01); *C04B 28/02* (2013.01); *C04B 38/10* (2013.01); *C04B 38/106* (2013.01); *E04B 2/00* (2013.01); *E04C 2/049* (2013.01); *B32B 2250/40* (2013.01); *B32B 2266/04* (2013.01); *B32B 2307/304* (2013.01); *B32B 2307/50* (2013.01); *B32B 2307/7246* (2013.01); *C04B 2111/00612* (2013.01); *C04B 2201/20* (2013.01); *C04B 2201/32* (2013.01); *C04B 2201/50* (2013.01); *E04B 1/80* (2013.01); *E04B 2/847* (2013.01); *E04C 5/073* (2013.01); *Y02W 30/92* (2015.05); *Y02W 30/94* (2015.05); *Y10T 428/24967* (2015.01); *Y10T 428/249968* (2015.04)

(56) References Cited

U.S. PATENT DOCUMENTS

| | | | | |
|---|---|---|---|---|
| 6,046,255 | A * | 4/2000 | Gray et al. .................... | 523/218 |
| 6,969,423 | B2 | 11/2005 | Li et al. | |
| 7,011,702 | B2 * | 3/2006 | Sheskey et al. ............... | 106/122 |
| 2010/0310846 | A1 * | 12/2010 | Berke et al. ................... | 428/219 |

FOREIGN PATENT DOCUMENTS

| | | |
|---|---|---|
| CN | 1987008 A | 6/2007 |
| CN | 101318348 A | 12/2008 |
| CN | 101475360 A | 7/2009 |
| CN | 101497533 A | 8/2009 |
| CN | 101812876 A | 8/2010 |
| CN | 102153364 A | 8/2011 |
| CN | 102277911 A | 12/2011 |
| CN | 102344385 A | 2/2012 |

OTHER PUBLICATIONS

Djerbi et al., "Influence of Traversing Crack on Chloride Diffusion into Concrete", Cement and Concrete Research. 2008, vol. 38(6): pp. 877-883.

Li and Leung, "Steady State and Multiple Cracking of Short Random Fiber Composites", ASCE J. of Engineering Mechanics, 1992, 188(11), pp. 2246-2264.

Lepech and Li, "Water Permeability of Engineered Cementitious Composites", Cement and Concrete Composites, 2009, 31(10), pp. 744-753.

Nambiar and Ramamurthy, "Air-void Characterization of Foam Concrete", Cement and Concrete Research, 2007, vol. 37(2): pp. 221-230.

Osborne, G.J. (1995) "The Durability of Lightweight Aggregate Concretes After 10 Years in Marine and Acid Water Environments", in Proceedings of International Symposium on Structural Lightweight Aggregate Concrete, pp. 591-603.

Shrivastava, O.P., "Lightweight Aerated Concrete—A Review", Indian Concrete Journal, 1977, vol. 51: pp. 10-23.

Wang and Li, "Lightweight Engineered Cementitious Composites (ECC)", in High Performance Fiber Reinforced Cementitious Composites—4, edited by A.E. Naaman and H. Reinhardt, 2003, pp. 379-390.

Wang et al, "Permeability Study of Cracked Concrete", Cement and Concrete Research, 1997, 27(3), pp. 381-393.

Weigler and Karl, "Structural Lightweight Aggregate Concrete with Reduced Density—Lightweight Aggregate Foamed Concrete", International Journal of Cement Composites and Lightweight Concrete, 1980, vol. 2(2): pp. 101-104.

Office Action of CN 201310055528.4 issued from the State Intellectual Property Office of the People's Republic of China on Jun. 23, 2014.

Office Action of CN201310055528.4 issued from the State Intellectual Property Office of the People's Republic of China on Feb. 3, 2015.

* cited by examiner

COMPOSITE WALL PANEL WITH LOW THERMAL CONDUCTIVITY AND SUFFICIENT STRENGTH FOR STRUCTURAL USE

CROSS-REFERENCE TO RELATED APPLICATION

This application claims benefits from the U.S. provisional patent application No. 61/633,920 filed Feb. 21, 2012, and the disclosure of which is incorporated herein by reference.

FIELD OF THE INVENTION

The present invention relates to a composite wall panel system with sufficient strength for structural use and low thermal conductivity, and a method for fabricating the system.

TECHNICAL BACKGROUND OF THE INVENTION

With increasing concerns of the greenhouse gas emission arising from electricity consumption and the rising energy cost, the demand for better thermal insulation in the building enclosures has drastically increased over the past few years. To improve the thermal insulation of building envelope, increasing the wall thickness is one of the solutions. However, it is less practical than directly reducing the overall thermal conductivity (k) of the envelopes of buildings.

For a given wall thickness, the thermal insulation of building envelope could be improved if the wall is constructed with foamed concrete with low thermal conductivity instead of normal concrete. Foamed concrete is a porous cementitious material formed by entrapping homogeneous pores into cementitious matrix using appropriate method. At present, introduction of pores can be achieved through mechanical means either by preformed foaming or mix foaming (Nambiar & Ramaurthy; 2007). The foaming agent for preformed foaming includes both the protein-based and synthetic-based foaming agent. Previous studies show that the thermal conductivity of concrete is usually proportional to its density (Shrivastava, 1977), and a decrease of dry density by 100 kg/m$^3$ results in a reduction of thermal conductivity by 0.04 W/mK for lightweight aggregate foamed concrete (Weigler & Karl, 1980). Jones and McCarthy (2003) showed that foamed concrete with a plastic density of 1000 kg/m$^3$ exhibited a typical thermal conductivity of 0.23-0.42 W/mK.

Since the strength of foamed concrete also decreases with increasing porosity, the strength of foamed concrete with sufficiently low thermal conductivity is always below the strength level for structural use. It would be desirable to develop a foamed concrete composition with both sufficiently low thermal conductivity and sufficient strength for structural use.

When foamed concrete is used to replace normal concrete, the presence of the pores will promote the penetration of moisture, chloride ion and carbon dioxide into foamed concrete and the durability against corrosion of steel reinforcement may be a concern. Previous studies showed that both the transport properties (including water permeability and chloride diffusivity) and carbonation resistance of foamed concrete are similar to those of normal concrete of similar strength (Chandra & Berntsson, 2003; Osborne, 1995). One important point to highlight, however, is that the test results are based on measurements on foamed concrete members that are not loaded and therefore not cracked. However, in practice, due to the low toughness of foamed concrete, it is easy for cracks to form in both foamed concrete and its protective coating/surface treatment (if applied) under loading. While the formation of fine cracks should not affect structural performance (as the tensile load capacity of concrete is neglected anyways), it can severely degrade the transport properties and carbonation resistance of foamed concrete (Chandra & Berntsson, 2003). Experimental findings in those studies actually indicated severe steel rusting at the vicinity of cracks in foamed concrete. With such a view, lightweight high performance fiber reinforced cementitious composites (FRCC) layers could be used, as a protective layer, together with foamed concrete. As there are no coarse aggregates used, the structure of FRCC can be designed as dense as that of normal concrete and even high strength concrete. More importantly, lightweight high performance FRCC can be designed to show high ductility, strain hardening and multiple cracking behaviors, and crack control capability under loading (Wang & Li, 2003). Indeed, previous studies showed that high performance FRCC has the ability to control crack openings to below 0.05 mm under loading (Li & Leung, 1992; Lepech & Li, 2009). According to Wang et al (1997) and Djerbi et al (2008), the water permeability and chloride diffusivity of concrete will not be affected by cracks that are so fine. In addition, with low density and thermal conductivity of lightweight FRCC, the thermal insulation performance of lightweight FRCC layer would be compatible to that of foamed concrete. It is hence possible to use lightweight FRCC layer to protect foamed concrete from external environmental factors under both loading and unloading conditions.

U.S. Pat. No. 6,969,423 discloses lightweight high performance fiber reinforced cementitious composite (FRCC) showing low density, high ductility and strain hardening as well as multiple cracking behaviors. However, both the thermal conductivity and transport properties of the lightweight FRCC are not disclosed.

With such a view, it would be desirable to develop a lightweight high performance FRCC layer with good thermal insulation and sufficient barrier resistance to moisture/chloride ion/carbon dioxide penetration, as a protective layer for foamed concrete.

SUMMARY OF THE INVENTION

The present invention pertains to a composite wall panel system comprising a foamed concrete core, sandwiched between at least two lightweight ductile fiber reinforced cementitious composite (FRCC) layers. The overall thickness is between 60-600 mm.

In the first aspect, the foamed concrete core is formed of different components comprising cement, foaming agent, water, fly ash, silica fume, slag, superplasticizer and fibers. Various composition designs are possible for making this core. An exemplary composition of the foamed concrete core includes the following components in percentage by volume: about 1 to about 60 percent by volume of cement, about 0 to about 75 percent by volume of fly ash, about 0 to about 50 percent by volume of slag, about 0 to about 20 percent by volume of silica fume, about 0 to about 50 percent by volume of sand, about 0 to about 75 percent by volume of hollow aggregate, about 1 to about 50 percent by volume of water, about 0 to about 2 percent by volume of naphthalene sulphonate based superplasticizer with a formula of ($[C_{10}H_7NaO_3S][CH_2O])_n$, about 0 to about 2 percent by volume of polycarboxylate ether based superplasticizer with a formula of $(C_4H_6O_2)_n$ and $C_{2n}H_{4n+2}O_{n+1}$, about 0.01 to about 1 percent by volume of protein based foaming agent with a formula of $(C_2H_2OR)_n$, wherein R is any amino acid substituent, about 0.01 to about 1 percent by volume of synthetic based foaming agent with a formula of $C_{12}H_{25}(OCH_2CH_2)_nOH$, about 0 to about 5 percent by volume of polypropylene fiber, about 0 to about 5 percent by volume of polyethylene fiber, about 0 to about 5 percent by volume of polyvinyl alcohol fiber, about 0 to about 5 percent by volume of glass fiber, about 0 to about 5 percent by volume of carbon fiber. The thickness of this core layer is between 50-500 mm. It is lightweight (800-1800 kg/m$^3$), with low thermal conductivity (0.25-0.7 W/mK) and sufficient compressive strength (1-70 MPa). A corresponding method of preparing the foamed concrete core is also disclosed as follows: a) introducing about 0.01 to about 1 percent by volume of a protein based foaming agent or synthetic based foaming agent into a pump of a foaming machine; b) providing pressurized air of 1-5 bars and pressurized water of 1-5 bars to the foaming machine; c) combining the pressurized air and water of (b) and the foaming agent of (a) to form foam bubbles; d) mixing about 1 to about 60 percent by volume of cement, about 0 to about 75 percent by volume of fly ash, about 0 to about 50 percent by volume of slag, about 0 to about 20 percent by volume of silica fume, about 0 to about 50 percent by volume of sand, and about 0 to about 75 percent by volume of hollow aggregate with water to form a concrete mix; e) adding about 0 to about 2 percent by volume of naphthalene sulphonate based superplasticizer with a formula of $([C_{10}H_7NaO_3S][CH_2O])_n$ or polycarboxylic acid based superplasticizer with formulae of $(C_4H_6O_2)_n$ and $C_{2n}H_{4n+2}O_{n+1}$ into the concrete mix of (d) and further mixing to improve the workability; f) adding about 1 to about 40% by volume of foam bubbles of (c) into the concrete mix of (d) and further mixing to form a foamed concrete mix; g) adding 0 to about 5 percent by volume of one fiber selected from polypropylene fiber, polyethylene fiber, polyvinyl alcohol fiber, glass fiber, or carbon fiber, into the foamed concrete mix of (f) and further mixing to give a uniform fiber dispersion in order to form a binder matrix. After hardening of the binder matrix by air dry, a foamed concrete core is then formed.

In the second aspect of the present invention, the FRCC layer is formed of different components comprising cement, sand, water, fiber, lightweight filler, fly ash, silica fume, slag, superplasticizer and HPMC. Various composite designs are possible for making this layer. The thickness of each FRCC layer is between 5-50 mm; the density of FRCC layer is about 1000-1800 kg/m$^3$. The at least two FRCC layers serve as protective layers with good barrier resistance to moisture/chloride ion/gas and good thermal insulation property.

BRIEF DESCRIPTION OF THE DRAWINGS

The accompanying drawings illustrate embodiments of the present invention and, together with the description, serve to explain the principles of the invention.

DESCRIPTION OF THE INVENTION

The present invention is related to a lightweight external composite wall panel system that can improve the thermal insulation of building envelope significantly comparing with ordinary concrete external wall. The plastic density of normal concrete is about 2400 kg/m$^3$, while the density of the presently disclosed composite wall panel is only 1000 kg/m$^3$-1800 kg/m$^3$ depending on the composition design of the core and/or the composite design of the FRCC layers. The reduced self-weight of the composite wall is beneficial to the construction processes by using precast concrete components in the construction sites. Compared to the thermal conductivity of normal concrete, which is about 1.7 W/mK-2.6 W/mK, the presently disclosed composite wall panel is much smaller with a value about 0.25-0.7 W/mK depending on the composition/composite designs of the core and FRCC layers. The significant improvement of thermal insulation of external walls can contribute as a 'green technology' in building construction. In summer, due to the higher outdoor temperature, heat flow by induction through the walls makes the indoor temperature keep on rising. Air conditioner is commonly used to keep the indoor room temperature at about 25° C. With the good thermal insulation performance of the composite wall panel system of the present invention, the indoor temperature and thus the electricity consumption for operating air conditioner is reduced. A demonstration illustrating the improved thermal insulation performance of the presently disclosed composite wall panel is described in example 1. The details of the composite wall panel are described in the following sections.

Figure 1:
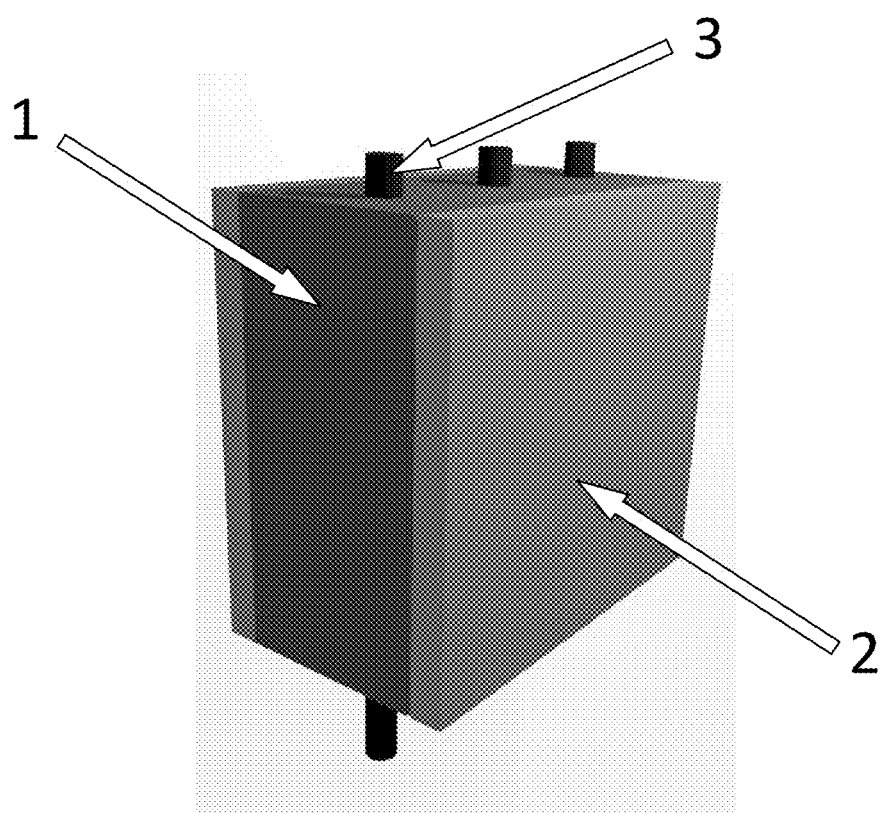
FIG. 1 is a side view of a wall panel, according to the present invention.

As shown in FIG. 1, the present invention is a composite wall panel system made up by layers of cementitious materials: a foamed concrete layer 1 sandwiched between two fiber reinforced cementitious composites (FRCC) layers 2. To resist bending and the resulting tensile stress in the wall panel, steel reinforcement 3 is applied.

Figure 2:
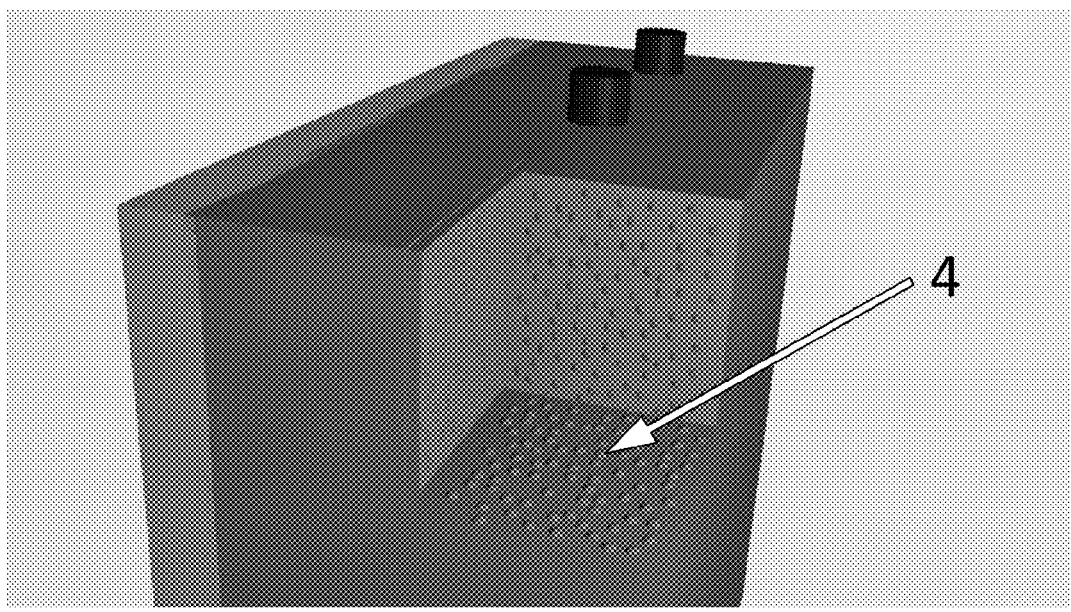
FIG. 2 is a cross-sectional elevation view of the wall panel of FIG. 1, showing the porous structure of foamed concrete.

The cross sections of foamed concrete 1 are shown in FIG. 2. Foamed concrete 1 is a porous cementitious material with air spaces 4 homogenously distributed throughout the concrete. These air spaces are made by foam bubbles using either protein-based foaming agent or synthetic-based foaming agent during the concrete mixing process. In one embodiment, the protein-based foaming agent is Profo-600 which is a kind of protein-hydrolization-based foaming agent. In another embodiment, the synthetic-based foaming agent is Rheocell 10 which is a kind of polyoxyethylene alkyl ether tenside. To produce the foam bubbles and thus the air spaces, the mentioned foaming agent is drawn into a foaming machine. Together with the supply of 2-4 bars of pressurized air and pressurized water, the foaming machine will generate stable foam bubbles. By mixing the foam bubbles directly into the fresh concrete mix, the density of foamed concrete 1 is reduced significantly. With different dosage of foam bubbles (e.g. 1%-40% by volume of foam bubbles), foamed concrete 1 of plastic density in 600-2000 kg/m$^3$ can be produced. Therefore, the plastic density of the presently disclosed composite wall can be controlled to 800 kg/m$^3$-1800 kg/m³. In an embodiment, with 10%-40% in volume fraction of the foam bubbles content, the plastic density can be controlled in a range of about 1200 kg/m³ to 1800 kg/m³.

Since the thermal conductivity of air is 0.024 W/mK, which is much lower than that of normal concrete (1.7 W/mK-2.6 W/mK), the thermal conductivity of foamed concrete 1 can be significantly reduced to 0.25-0.7 W/mK by introducing the air spaces 4 into the concrete 1.

The foamed concrete 1 is formed from a foam concrete composition comprising a mixture of cementitious material, foaming agent and polymeric fibers. Cementitious material refers to conventional concretes and mixtures which rely on hydraulic curing mechanisms. The cementitious material comprises one or more of cement, fly ash, superplasticizer and water. The superplasticizer used in the composition for forming the foamed concrete 1 includes naphthalene sulphonate based superplasticizer or polycarboxylic acid based superplasticizer. In one embodiment, the naphthalene sulphonate based superplasticizer is Rheobuild 561 which is a kind of Naphthalene Sulfonate Formaldehyde Condensates. In another embodiment, the polycarboxylic acid based superplasticizer is Glenium ACE 80 which is a kind of polycarboxylic acid based superplasticizer. In addition to the foregoing components in the cementitious material, it should be further understood that other additional components such as slag, silica fume, and aggregate may be added to the cementitious material as well. By proper adjustment of design mix (e.g. ratio of water/cement, preferably ratio of 0.3), the foamed concrete 1 can provide 28-day compressive strength of 1-70 MPa with different degree of air spaces 4. The measured compressive strength and thermal conductivity are illustrated in example 2.

Figure 3:
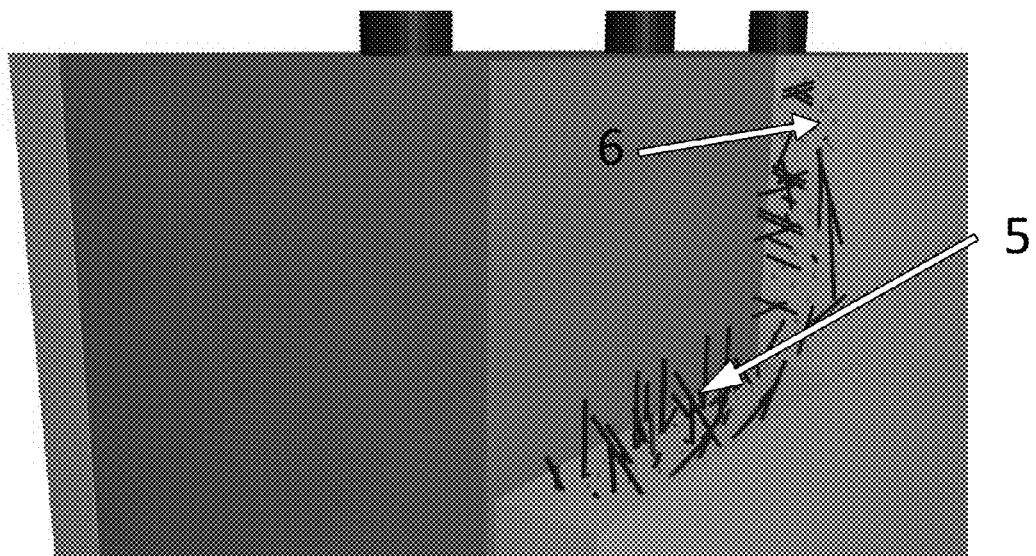
FIG. 3 is a cross-sectional elevation view of the wall panel of FIG. 1, showing the distribution of fibers and lightweight fillers in the FRCC layer.

In the present invention, the FRCC layer 2 is formed from a lightweight fiber reinforced cementitious composite composition comprising a mixture of cementitious material, lightweight fillers and fibers. FIG. 3 shows the cross sections of the FRCC layer where 5 is the discontinuous fiber while 6 is the lightweight filler.

The cementitious material generally comprises one or more of cement, silica sand, water, hydroxypropyl methyl cellulose (HPMC), superplasticizer and pozzolans. Suitable examples apply to pozzolans where the compositions include but not limit to fly ash, slag and silica fume. With the use of pozzolans and low water/binder (cement plus pozzolans) ratio (e.g. at 0.3-0.45 and preferably at 0.325-0.375 when S15 (3M) glass bubble is used as lightweight filler), the transport properties of FRCC can even reach the level of high strength concrete.

More importantly, in the present invention, FRCC is designed to show strain hardening and multiple cracking behavior, high strain capacity and crack control capability under tension, by using a suitable amount of discontinuous fibers 5. One of suitable examples of the discontinuous fibers include but not limit to PVA. Preferably, the fiber content is about 1.75% in volume ratio when PVA fiber is employed.

For the whole composite wall panel to achieve good thermal insulation performance, apart from the foamed concrete core, the thermal conductivity of the FRCC layers should also be low. Addition of lightweight fillers 6 helps achieve this aim. Lightweight fillers include but not limit to glass bubbles (e.g. S15 (3M) glass bubble) and ceramic bubbles (e.g. 3M™ Ceramic Microspheres) used in the present invention (at a content of about 30% by volume). Their presence decreases the density and thus the thermal conductivity of FRCC, without significantly destroying the ductility, crack control capability and transport properties of FRCC.

In the present invention, the FRCC layer is applied on the foamed concrete wall to protect foamed concrete from moisture, chloride ion and carbonation, and hence protect steel from corrosion, under both unloading and loading conditions. Being cementitious in nature, the FRCC layer is perfectly compatible with common wall finishes. It should be noted that the application of a ductile FRCC layer on the external wall surface has one additional advantage. Many years down the road, when some of the steel reinforcements in the wall actually rust and induce cracking of the concrete cover, the loose concrete will be trapped by the ductile FRCC layer. The falling of spalled concrete, which imposes a great threat to the pedestrians, can hence be avoided by the present invention.

In the present invention, the composite wall panel system with sandwich structure can be either precast or constructed on site. For both precast and on-site construction, the composite wall panel can be made by, but not limit to, casting in three layers, in the order of FRCC, foamed concrete and FRCC layers. In the casting process, each of the FRCC layers can be applied on the foamed concrete by, but not limit to, spraying or plastering. Another possibility is to have two layers; with FRCC as an outer layer and foamed concrete as an internal wall surface.

EXAMPLE 1

Figure 4:
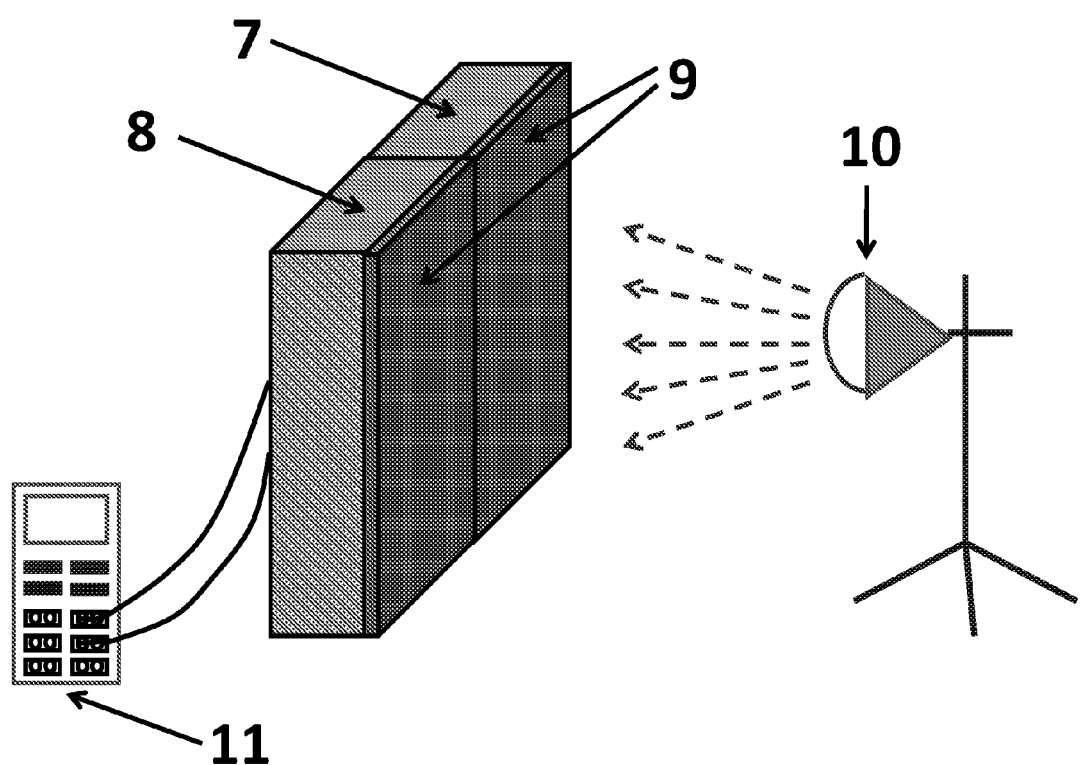
FIG. 4 is a setup for illustrating the difference in the thermal insulation property between foamed concrete and normal concrete.

The thermal insulation property of foamed concrete is illustrated in this example. FIG. 4 shows the setup including a normal concrete 7, a foamed concrete 8, a FRCC layer 9 on both normal concrete 7 and foamed concrete 8 surfaces, an infrared lamp 10 and a thermocouple meter 11. The specimen size of the normal concrete 7 and foamed concrete 8 is 300 mm (length)×200 mm (width)×100 mm (depth). The density of normal concrete 7 and foamed concrete 8 are about 2400 kg/m³ and 1300 kg/m³ respectively. Since the present invention is a composite wall panel comprised of foamed concrete core and one or more FRCC layers, a FRCC layer 9 is cast on foamed concrete 8. To have a fair comparison, the same FRCC layer 9 is also cast on a normal concrete 7 with the same thickness. The infrared lamp 10 is used to simulate the situation where external wall is exposed to sunlight. With the infrared lamp 10 continuously shining on the FRCC layers 9 (for 2 hours in this example), the temperature of the FRCC layer 9 keeps rising and heat is transferred from the FRCC layer 9 to the normal concrete 7/foamed concrete 8 by conduction. By measuring the temperature on the other side (without FRCC layer) of normal concrete 7/foamed concrete 8 with the use of thermocouple meter 11, the thermal insulation property of FRCC layer-incorporated normal concrete 7/foamed concrete 8 can be compared.

The measured temperature of normal concrete 7 and foamed concrete 8 on the side without FRCC layer were summarized as follow:

TABLE 1

| Time (minutes) | Temperature of normal concrete 7 (T1) | Temperature of foamed concrete 8(T2) | Temperature difference (T1 − T2) |
| --- | --- | --- | --- |
| 0 | 23.0° C. | 23.0° C. | 0° C. |
| 30 | 23.9° C. | 23.2° C. | 0.7° C. |
| 60 | 26.6° C. | 23.8° C. | 2.8° C. |
| 90 | 29.9° C. | 24.5° C. | 4.5° C. |
| 120 | 31.5° C. | 25.5° C. | 6.0° C. |

After turning on the infrared lamp 13 for 2 hours, the temperature of FRCC layer-incorporated normal concrete increases from 23° C. to 31.5° C., with 8.5° C. difference.

However, the temperature of FRCC layer-incorporated foamed concrete increases from 23° C. to 25.5° C., with 2.5° C. difference only. This example indicates that the thermal insulation performance of a concrete wall is remarkably improved if foamed concrete is used.

EXAMPLE 2

Figure 5:
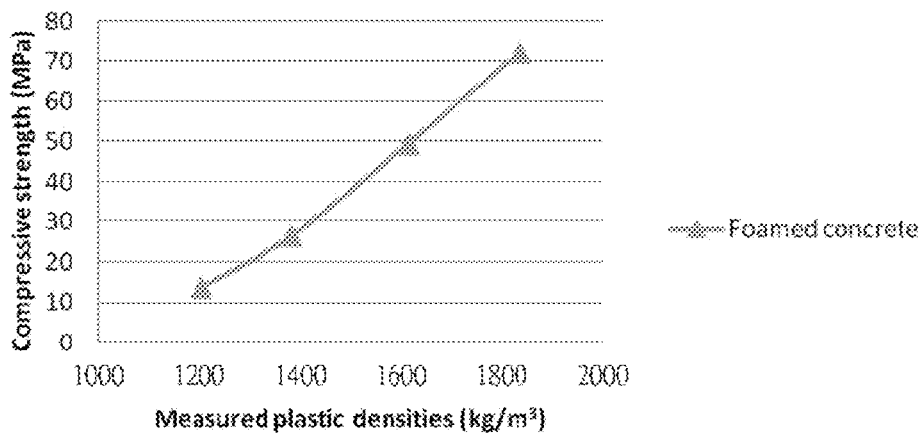
FIG. 5 shows the trend of 28-day compressive strength against plastic density of foamed concrete

For the composite wall panel of the present invention to serve as precast external wall, sufficient structural strength is required. Compared to ordinary foamed concrete which can only provide compressive strength of less than 15 MPa, the foamed concrete of the presently disclosed composite wall panel can provide 4-70 MPa compressive strength depending on the composition design of the concrete core, as shown in our experimental results. The composition design of the foamed concrete core is shown in Table 2. With different designs of composition, the density and compressive strength of the foamed concrete core are adjusted. The trend of 28-day compressive strength against plastic density of foamed concrete is shown in FIG. 5. From the results, the foamed concrete of the present invention with plastic density higher than 1400 kg/m³ can provide 28-day compressive strength higher than 25 MPa. For the foamed concrete with plastic density 1600 kg/m³, a 28-day compressive strength of about 50 MPa can be provided. This shows that the foamed concrete used in the composite wall panel of the present invention provides sufficient compressive strength for the structural application of external wall.

TABLE 2

| Cement | Fly ash | Silica fume | Fiber | Superplasticizer | Foam Bubbles |
| --- | --- | --- | --- | --- | --- |
| 1-60% | 0-75% | 0-20% | 0-5% | 0-2% | 1-40% |

Figure 6:
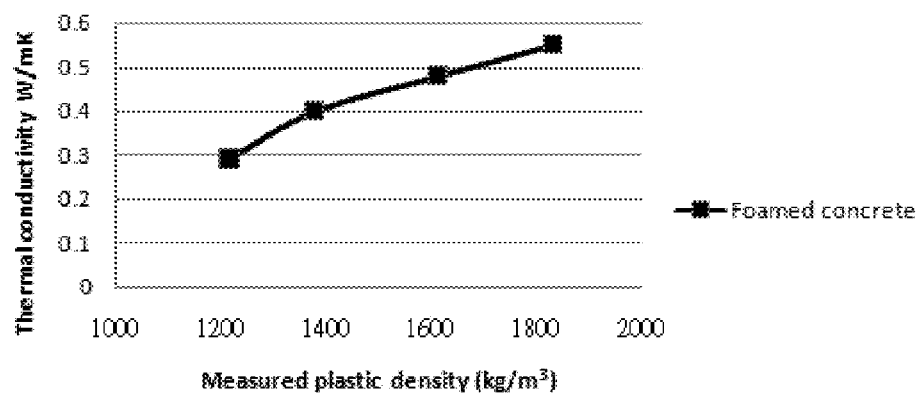
FIG. 6 shows the trend of thermal conductivity against plastic density of foamed concrete.

However, the higher the density of the foamed concrete core is, the higher is the thermal conductivity. To show the relationship of thermal conductivity and plastic density, the thermal conductivity of the foamed concrete core of the present invention is measured. The trend of thermal conductivity against plastic density of foamed concrete is shown in FIG. 6. From the results, the thermal conductivity of the foamed concrete core is only 0.3 to 0.55 W/mK. Compared to the thermal conductivity of normal concrete which is about 1.7-2.6 W/mK, the thermal conductivity of foamed concrete core used in the present invention is reduced to one-fifth. This means that the thermal insulation of the foamed concrete core of the present invention can be five times more effective than that of normal concrete. With such improved thermal insulation and the sufficient strength of the foamed concrete, the composite wall panel of the present invention offers great advantage as a precast external wall having a significantly improved thermal insulation.

EXAMPLE 3

This example serves to illustrate the concerned properties of the fiber reinforced cementitious composite (FRCC) used for preparing the protective layer of the present invention.

The FRCC composite used for the protective layer preparation comprises cement, fly ash, water, lightweight filler, silica sand, discontinuous polyvinyl alcohol (PVA) fiber, superplasticizer and Hydroxypropyl Methyl Cellulose (HPMC). The examples of different proportions of the components in the composite, expressed as parts by weight, unless otherwise indicated, are tabulated as follows:

TABLE 3

| Mix No. | Cement | Fly ash | Water | Sand | Lightweight filler | HPMC | SP | Fiber (vol. %) |
| --- | --- | --- | --- | --- | --- | --- | --- | --- |
| 1 | 1 | 0 | 0.35 | 0.165 | 0.065 | 0.0011 | 0.015 | 1.75 |
| 2 | 0.67 | 0.33 | 0.35 | 0.165 | 0.06 | 0.0011 | 0.008 | 1.75 |
| 3 | 0.5 | 0.5 | 0.35 | 0.165 | 0.065 | 0.0011 | 0.007 | 1.75 |
| 4 | 0.2 | 0.8 | 0.35 | 0.165 | 0.05 | 0.0011 | 0.007 | 1.75 | where SP = superplasticizer

The cement used is Type I Portland cement (BS 12:1996, 52.5N) from Green Island Cement Co. Limited, Hong Kong. The fly ash is supplied by the CLP Holdings Limited, Hong Kong. One type of glass bubble, S15, from 3M Co., Minnesota, USA, is used as lightweight filler. The silica sand has a size distribution from 180 um to 270 um. The HPMC used is known as Ruiteng™ HPMC, which is supplied by Tongzhouda Tech Co. Ltd., Shenzhen, China. It is used as viscosity controlling agent. The superplasticizer, Glenium ACE80, comes from BASF, is a kind of polycarboxylate ether polymer which is also used as the polycarboxylic acid based superplasticizer for the foamed concrete core of the present invention. The PVA fiber has a diameter of 39 μm and a length of 12 mm and is supplied by Kurary Co. Ltd., Osaka, Japan. It should be noted that any equivalents of the commercially available components as described herein in the FRCC mixes can be used to prepare the FRCC mix of the present invention, provided that the FRCC mixes are prepared according to the mix proportions as described herein and the resulting FRCC layer possesses the same properties as described in the present invention.

The above mentioned compositions of FRCC are prepared and mixed in a Hobart mixer with a planetary rotating blade. Cement, fly ash, sand, glass bubble and HPMC powder are dry mixed for 6-7 minutes, and then water and superplasticizer are added and mixed for another 5-15 minutes. Finally, the fibers are slowly added and mixed for 5 more minutes. The fresh mixture is cast into stainless steel molds and gently vibrated. Specimens are demolded after 24 hours and then wet cured (25±2° C., 98% RH) for 28 days. The FRCC samples are dried in air and their physical properties are measured.

A uniaxial tensile test is conducted to characterize the tensile behavior of the FRCC material for the protectively layer. The nominal size of the test coupon specimen is 350 mm×50 mm×15 mm. Glass fiber reinforced polymer (GFRP) (100 mm×50 mm×1 mm) and aluminum plates (70 mm×50 mm×1.5 mm) are adhesively bonded to the coupon specimens ends to facilitate gripping and avoid failure at the grips. Tests are conducted with an MTS machine with 250 kN capacity under displacement control. The loading rate is 0.1 mm/min throughout the test. Two external LVDTs (linear Variable Displacement Transducer) are attached to specimen side surface with a gauge length of about 150 mm to measure the displacement. The tensile test coupon specimens are also used for density measurement by using a digital balance and caliper.

The thermal conductivity of the protective layer is measured with a KEM Quick Thermal Conductivity Meter. The test specimen is 100 mm in diameter and 50 mm in depth. The test results for each example FRCC mix are summarized in Table 4, including the density, thermal conductivity, tensile strength and strain capacity.

TABLE 4

| Mix No. | Density (kg/m³) | Tensile first cracking strength (MPa) | Tensile ultimate strength (MPa) | Tensile strain capacity (%) | Thermal conductivity (W/mK) |
| --- | --- | --- | --- | --- | --- |
| 1 | 1399.55 | 3.87 | 4.64 | 1.41 | 0.56 |
| 2 | 1401.14 | 2.90 | 4.48 | 1.66 | 0.53 |
| 3 | 1289.49 | 2.81 | 3.87 | 1.61 | 0.49 |
| 4 | 1276.69 | 2.68 | 3.92 | 3.91 | 0.47 |

Figure 7:
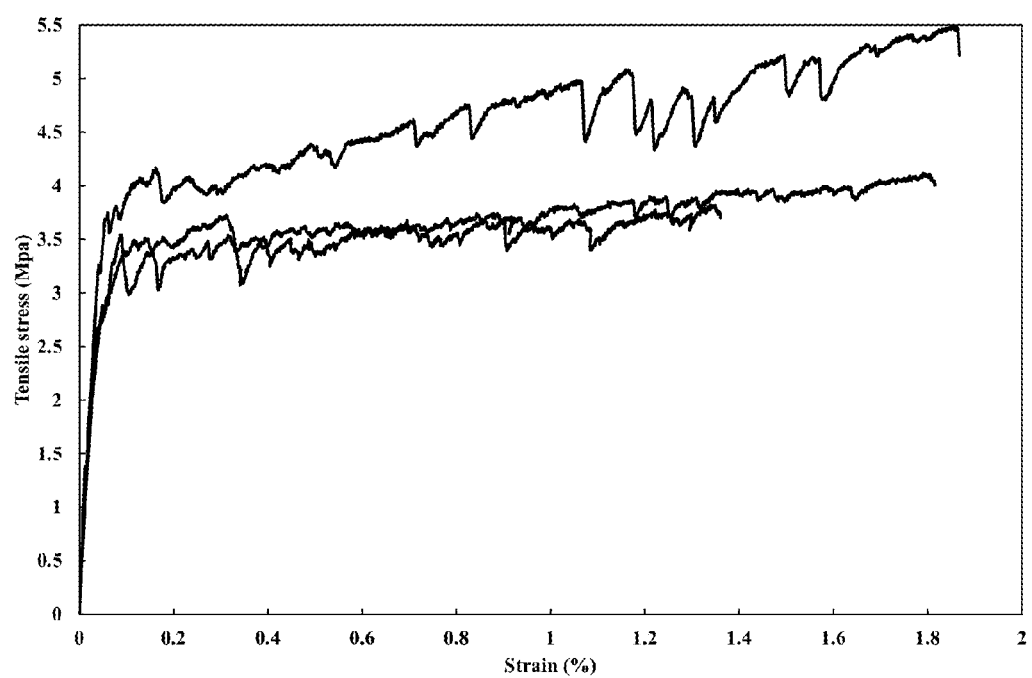
FIG. 7 illustrates a stress strain curve for one embodiment of fiber reinforced cementitious composite for preparing the protective layer in the present invention. The test is performed in triplicate.
Figure 8:
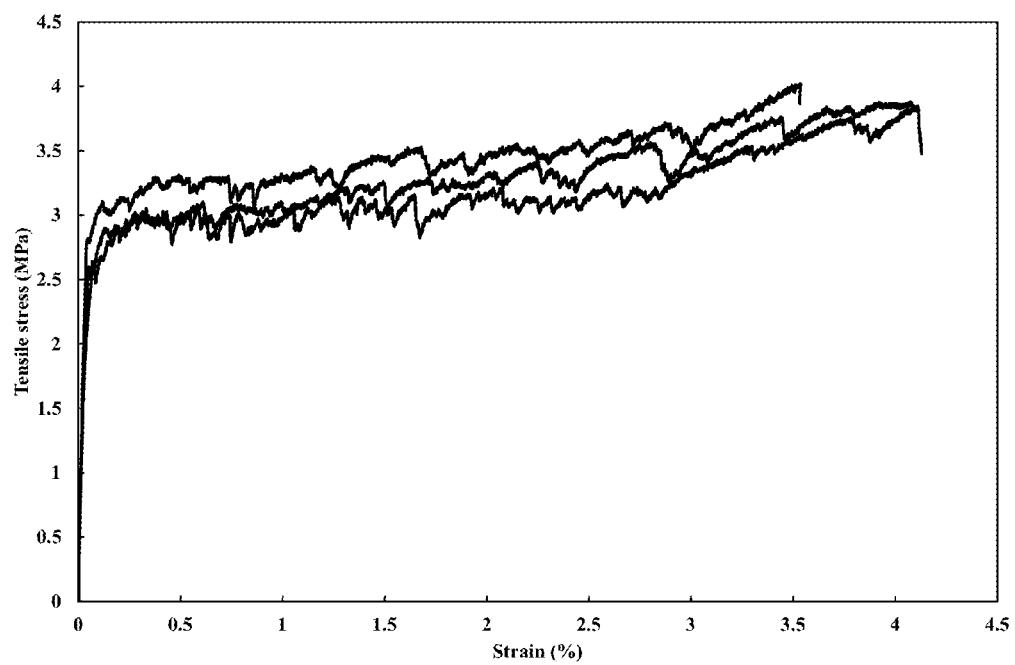
FIG. 8 illustrates a stress strain curve for a further embodiment of fiber reinforced cementitious composite for preparing the protective layer in the present invention. The test is performed in triplicate.

As shown in Table 3, mixes 1, 2, 3 and 4 have same weight ratios of sand to binder (cement plus fly ash) and water to binder as well as same fiber content, but different weight ratio of cement to fly ash for making FRCC with different structure and different glass bubble contents to achieve density below 1400 kg/m³. The test results show that the densities of mixes 1 and 2 are about 1400 kg/m³, while the density of mixes 3 and 4 are about 1300 kg/m³, which are all far below the density of cement mortar (around 2000 kg/m³) and normal concrete (around 2400 kg/m³). Moreover, the thermal conductivity of the prepared FRCC mixes decreased from 0.56 W/mK to 0.47 W/mK with decreasing density, similar to the thermal conductivity of the foamed concrete with density of 1500-1600 kg/m³. Table 3 and 4 indicate that more glass bubbles are needed to achieve a specified density with increasing cement content. Also, superplasticizer is needed to avoid damage of glass bubbles during mixing and ensure the workability of FRCC. It is found that the increase of fly ash content is beneficial to reducing the thermal conductivity of FRCC. The test results (in triplicate) also show that all the prepared mixes exhibit significant strain-hardening behavior (as shown in FIG. 7 and FIG. 8) and a relatively higher tensile strain capacity, which ranges from 1.41% to 3.91% with decreasing cement content, compared with 0.01% for unreinforced cement mortar. A comparison among the tensile test results of mixes 1, 2, 3 and 4 indicates that a higher weight ratio of cement to fly ash can lead to a higher tensile first cracking strength and ultimate strength, but a lower tensile strain capacity. Finally, the resulting FRCC layer of the present invention has a carbonation rate in the range of 1-2.5 mm/year$^{0.5}$, which is similar to that of the normal concrete.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

REFERENCES CITED

Chandra S, and Berntsson (2003) Lightweight Aggregate Concrete: Science, Technology and Application, Noyes Publications.

Djerbi, A., Bonnet, S., Khelidj, A. and Baroghel-bouny, V. (2008). Influence of Traversing Crack on Chloride Diffusion into Concrete. Cement and Concrete Research. Vol. 38(6): pp. 877-883.

Li, V. C., and Leung, C. K. Y. (1992). "Steady State and Multiple Cracking of Short Random Fiber Composites", ASCE J. of Engineering Mechanics, 188(11), pp. 2246-2264.

Lepech, M. D. and Li, V. C. (2009) "Water Permeability of Engineered Cementitious Composites" Cement and Concrete Composites, 31(10), pp. 744-753.

Nambiar, E. K. K. and Ramamurthy, K. (2007). Air-void Characterization of Foam Concrete. Cement and Concrete Research. Vol. 37(2): pp. 221-230.

Osborne, G. J. (1995) "The Durability of Lightweight Aggregate Concretes After 10 Years in Marine and Acid Water Environments", in Proceedings of International Symposium on Structural Lightweight Aggregate Concrete, pp. 591-603.

Shrivastava, O. P. (1977). Lightweight Aerated Concrete—A Review. Indian Concrete Journal. Vol. 51: pp. 10-23.

Wang, S. and Li, V. C. (2003) "Lightweight ECC", in High Performance Fiber Reinforced Cementitious Composites—4, edited by A. E. Naaman and H. Reinhardt, pp. 379-390.

Wang, K., Jansen, D., Shah, S, and Karr, A. (1997). "Permeability Study of Cracked Concrete", Cement and Concrete Research, 27(3), pp. 381-393.

Weigler, H. and Karl, S. (1980). Structural Lightweight Aggregate Concrete with Reduced Density—Lightweight Aggregate Foamed Concrete. International Journal of Cement Composites and Lightweight Concrete. Vol. 2(2): pp. 101-104.

Li Victor C., Wang Shuxin, "Lightweight Strain Hardening Brittle Matrix Composites," U.S. Pat. No. 6,969,423.

The disclosure of the foregoing cited references is incorporated herein by reference and its entirety.

What is claimed is:

1. A composite for forming a lightweight ductile fiber reinforced cementitious composite (FRCC) protective layer to protect a foamed concrete core in a composite wall panel from heat, moisture, liquid, chemical ions, carbon dioxide and other environmental factors, said composite comprising cement, silica sand, water, polyvinyl alcohol (PVA) fiber, a lightweight filler, pozzolans, superplasticizer, and Hydroxypropyl Methyl Cellulose (HPMC);

wherein said PVA fiber has a mean diameter of about 10 μm to 60 μm and a mean length of about 4 mm to 30 mm;

wherein the lightweight filler comprises bubbles, each of the bubbles having a mean diameter of about 10 μm to 150 μm and a mean density of about 0.15 g/cm³ to 0.75 g/cm³ for decreasing thermal conductivity of the FRCC;

wherein the pozzolans comprise fly ash, slag, and silica fume;

wherein a binder comprises the pozzolans and the cement;

wherein a ratio of the water to the cement plus the pozzolans is 0.3-0.45 by weight simultaneously with the bubbles are used as the lightweight filler for improving barrier resistance of the FRCC to liquid, gas and ion;

wherein a ratio of the cement: the fly ash: the water: the silica sand: the lightweight filler: the HPMC: the superplasticizer by weight is 0.2: 0.8: 0.35: 0.165: 0.05: 0.0011: 0.0007;

wherein said composite is lightweight and has a density of about 1200 to 1800 kg/m³ after curing in wet condition;

wherein said composite has a water permeability of about $0.05 \times 10^{-12}$ to $50 \times 10^{-12}$ m/s;

wherein said composite has a chloride diffusion coefficient of about $0.05 \times 10^{-12}$ to $50 \times 10^{-12}$ m²/s;

wherein said composite has a carbonation rate of about 1-2.5 mm/year$^{0.5}$.

2. The composite of claim 1, wherein said cement is hydraulically settable cement.

3. The composite of claim 1, wherein the content of said PVA fiber is about 1.5 to 2.5 percent by volume.

4. The composite of claim 1, wherein each of the silica sand has a mean diameter of about 50 µm to 300 µm.

5. The composite of claim 1, wherein the bubbles have walls made of glass, ceramic or polymer.

6. The composite of claim 1, wherein said composite exhibits strain hardening behavior and has a tensile strain capacity of about 0.3% to 4.5%.

7. A FRCC protective layer formed from the composite of claim 1, wherein at least two FRCC protective layers are precast or cast on site to sandwich said foamed concrete core in order to form a 3-layer concrete structure of the foamed concrete.

8. The FRCC protective layer of claim 7, wherein each of said FRCC protective layers has a thickness ranging from 5 mm to 50 mm.

9. A foamed concrete structure comprising the FRCC protective layer of claim 1.

10. The structure of claim 9, wherein said structure is built by precast or cast on site.

11. A wall panel comprising a foamed concrete core and at least two of a fiber reinforced cementitious composite (FRCC) protective layers;

wherein said foamed concrete core is sandwiched between said at least two FRCC protective layers;

wherein said at least two FRCC protective layers are formed by the composite of claim 1.

12. The wall panel of claim 11, wherein said wall panel is made by precast or cast on site.

13. The wall panel of claim 11, wherein said foamed concrete core has a thickness of about 50 mm to 500 mm.

14. The wall panel of claim 11, wherein each of said at least two protective layers has a thickness of about 5 mm to 50 mm.

15. The wall panel of claim 11, wherein said wall panel has a thickness of about 60 mm to 600 mm.

16. The wall panel of claim 11, wherein said foamed concrete core is formed by a foamed concrete core composition, said composition comprising:

1 to 60 percent by volume of cement;

0 to 75 percent by volume of fly ash;

0 to 50 percent by volume of slag;

0 to 20 percent by volume of silica fume;

0 to 50 percent by volume of sand;

0 to 75 percent by volume of hollow aggregate with water;

0 to 2 percent by volume of naphthalene sulfonate based superplasticizer or polycarboxylic acid based superplasticizer;

1 to 40 percent by volume of foam bubbles, wherein the foam bubbles are formed by combining pressurized air of 1-5 bars and pressurized water of 1-5 bars with a protein based foaming agent or a synthetic based foaming agent in a foaming machine, and the foam bubbles produce air spaces distributed throughout the foamed concrete core; and 0 to 5 percent by volume of one fiber selected from polypropylene fiber, polyethylene fiber, polyvinyl alcohol fiber, glass fiber, or carbon fiber.

* * * * *